United States Patent [19]

Kawabe

[11] Patent Number: 4,577,808
[45] Date of Patent: Mar. 25, 1986

[54] SPINNING REEL BRAKE
[75] Inventor: Yuzo Kawabe, Sakai, Japan
[73] Assignee: Shimano Industrial Company Limited, Osaka, Japan
[21] Appl. No.: 578,105
[22] Filed: Feb. 8, 1984
[30] Foreign Application Priority Data Feb. 16, 1983 [JP] Japan .............................. 58-21420[U]

[51] Int. Cl.$^4$ ...................... A01K 89/01; A01K 89/02
[52] U.S. Cl. ............................................... 242/84.5 R
[58] Field of Search .................... 242/84.51 A, 84.5 A, 242/84.51 R, 84.5 R, 211-214, 216-221; 446/45, 46

[56] References Cited

U.S. PATENT DOCUMENTS

| | | | |
|---|---|---|---|
| 1,447,390 | 3/1923 | Kucharski | 464/45 |
| 2,775,417 | 12/1956 | Freund | 242/84.21 R |
| 4,222,537 | 9/1980 | Noda | 242/217 |
| 4,371,124 | 2/1983 | Gifford et al. | 242/84.51 A |
| 4,391,419 | 7/1983 | Iwama et al. | 242/84.5 A |

Primary Examiner—Billy S. Taylor
Attorney, Agent, or Firm—Stevens, Davis, Miller & Mosher

[57] ABSTRACT

A drag mechanism for a spinning reel includes a first drag washer supported non-rotatably to a spool shaft, a second drag washer supported non-rotatably to a reel body, and a lining plate interposed between the first and second drag washers. The first drag washer includes a tubular holding portion located at a central position thereof. The first drag washer is supported to the spool shaft by the tubular holding portion. A rotary cylinder is supported rotatably to the reel body, with the tubular holding portion being supported to an outer peripheral surface of the rotary cylinder, such that the tubular holding portion and the rotary cylinder are axially movable relative to each other but are not rotatable relative to each other. The tubular holding portion is longer than the extent of the thickness of the lining plate. The lining plate and the second drag washer are supported on an outer peripheral surface of the tubular holding portion. The first drag washer includes teeth on its outer periphery and the reel body includes a sound-generator which engages with the sound-generating teeth to generate a sound upon rotation of a spool associated with the reel. The drag mechanism can include first and second sets of first and second drag washers with a lining plate interposed between each set of the first and second drag washers, with the second set including a first drag washer having a projection abutting against the second drag washer of the first set.

2 Claims, 5 Drawing Figures

SPINNING REEL BRAKE

FIELD OF THE INVENTION

The invention relates to a spinning reel and more particularly to a spinning reel wherein a reel body supports a spool shaft having a spool and a line-winding mechanism for winding a fishing line onto the spool, the spool shaft being supported to the reel body such that it is rotatable and slidable longitudinally of the reel body and having a drag mechanism which comprises a first drag washer supported non-rotatably to the spool shaft, a second drag washer supported non-rotatably to the reel body and a lining plate interposed between the drag washers.

BACKGROUND OF THE INVENTION

Conventionally, in the above-described type of spinning reel, the first drag washer is supported non-rotatably to the spool shaft and is formed in a plate-like shape. The first drag washer is forcibly rotated according to the rotation of the spool shaft while it is braked or stopped from rotating through pressure applied by the second drag washer along with the lining plate. Hence, the fitting portion where the first drag washer is fixed to the spool shaft is subjected to a concentrated load and is therefore subject to becoming deformed or broken down, leading to the drag washer not rotating integrally with the spool shaft. In this condition, the drag mechanism provides inaccurate adjustment of the resistance applied by the drag mechanism to rotation of the spool shaft.

SUMMARY OF THE INVENTION

The invention has been designed to overcome the above-described problems. An object of the invention is to provide a spinning reel wherein the first drag washer of the drag mechanism is provided at its center with a tubular holding portion which is supported to the spool shaft such that it is integrally rotatable therewith. The holding tubular portion is adapted to peripherally support the lining plate, so that even when the first drag washer has braking pressure applied thereto by the second drag washer while the first drag washer is simultaneously being forcibly rotated by the spool shaft, the fitting portion of the first drag washer to the spool shaft can be prevented from being deformed or broken down, and the drag mechanism can always accurately adjust the resistance applied to the rotation of the spool shaft.

In detail, the spinning reel of the invention comprises a reel body; a spool shaft having a spool and supported to the reel body rotatably and slidably longitudinally thereof; a line-winding mechanism for winding the fishing line onto the spool; and a drag mechanism comprising a first drag washer related to the spool shaft; and supported thereto not-rotatably, a second drag washer related to the reel body and supported thereto not-rotatably, and a lining plate interposed between these drag washers. The spinning reel is characterized in that the first drag washer of the drag mechanism is provided at its center with a tubular holding portion having a non-circular through bore, and the first drag washer is supported to the spool shaft relationally thereto by the tubular holding portion. The tubular holding portion is adapted to hold the lining plate at a peripheral surface of the tubular holding portion.

Hence, the first drag washer can be surely and effectively reinforced by the tubular holding portion at the portion of the drag washer which surrounds the spool shaft and which is subjected to a rotation load of the spool shaft, thereby preventing deformation or breakdown of the first drag washer due to the rotation load of the spool shaft and also providing the drag mechanism with a highly stable and constant relationship between the frictional connection force at the first and second drag washers and the corresponding pressing force of the drag mechanism. Further, such mechanism always provides accurate adjustment of the drag mechanism of the resistance applied to rotation of the spool.

Further objects and advantages of the present invention will be apparent from the following description, with reference being made to the accompanying drawings wherein a preferred form of the present invention is clearly shown.

DETAILED DESCRIPTION OF THE INVENTION

Figure 1:
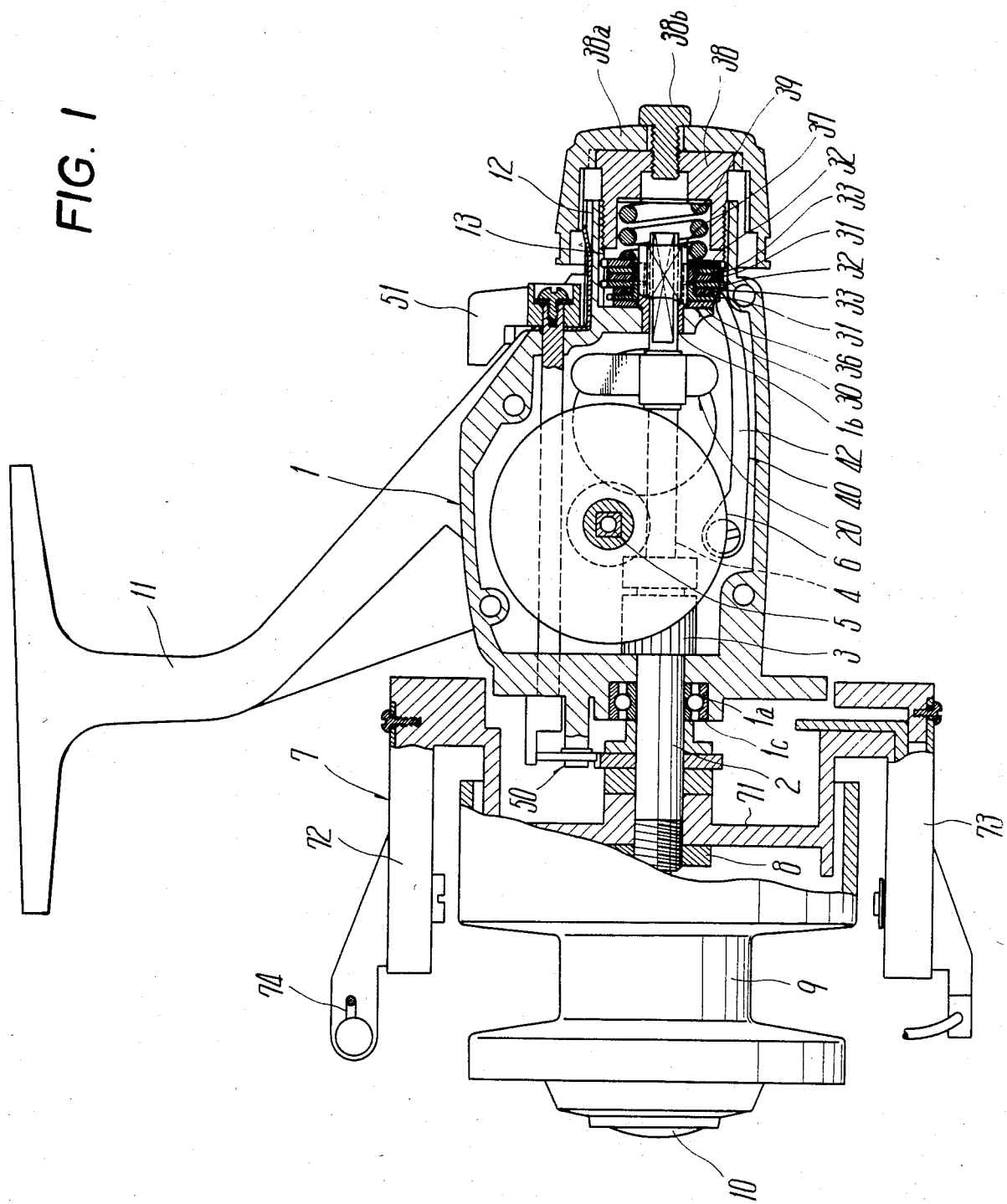
FIG. 1 is a partially sectional front view of an embodiment of the invention.

Reference numeral 1 designates a hollow reel body having at its upper surface a mounting leg 11 for mounting to a fishing rod and at its front and rear surfaces through bore 1a, 1b respectively. Reference numeral 2 designates a tubular shaft having a pinion gear 3. Tubular shaft 2 is rotatably supported to the reel body 1 at the front through bore 1a by means of bearing 1c. Reference numeral 4 designates a spool shaft supported to reel body 1 by means of tubular shaft 2 such that spool shaft 4 is rotatable and longitudinally movable relative to the reel body 1. The reel body 1 has at both side walls a pair of shaft bores extending perpendicularly to the axis of the tubular shaft 2, and a handle shaft 5 having a handle (not shown) is rotatably supported to the shaft bores. A master gear 6 engageable with the pinion gear 3 is provided on handle shaft 5 at its portion which projects into the reel body 1.

The tubular shaft 2 projects at one end into the reel body 1, with its projecting end including the peripheral pinion gear 3. The tubular shaft 2 extends at its other end outwardly from the reel body 1 to support peripherally at this outward projecting end a rotary frame 7 which is fixed to the tubular shaft 2 by a lock nut 8 and which includes a disc-like shaped body 71 having a through bore for insertion onto the tubular shaft 2 and a pair of arms 72, 73 supporting a bail arm 74.

The spool shaft 4 passes through the tubular shaft 2 to extend at one end into the reel body 1 and extend at the other end outwardly thereof. At this outward projecting end is peripherally supported a spool 9 which is fixed to the spool shaft 4 by screwing a tightening means 10 with a screw-threaded portion formed at the foremost end of the spool shaft 4. Additionally, between the handle shaft 5 and the portion of the spool shaft 4 projecting into the reel body 1 is provided a reciprocation mechanism 20 for the spool shaft 4. Spool shaft 4 is provided at its rear end with a drag mechanism 30 which comprises a first drag washer 31 supported not-rotatably to the spool shaft 4, a second drag washer 32 supported not-rotatably to the reel body 1, and a lining plate 33 interposed between the first and second drag washers 31, 32.

The abovesaid construction is known and provides a line-winding mechanism comprising the tubular shaft 2, rotary frame 7 and bail arm 74, so that the handle is operated to drive the line-winding mechanism and to reciprocate the spool shaft 4 longitudinally relative to reel body 1, thereby winding the fishing line onto the spool.

Figure 2A:
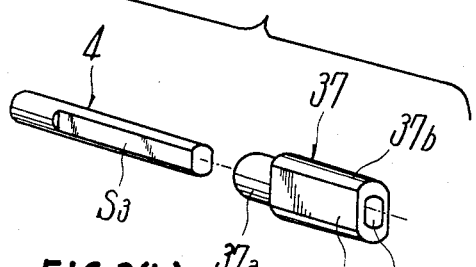
FIG. 2(a) is an exploded explanatory view showing the spool shaft and the rotary cylinder before assembly.
Figure 2B:
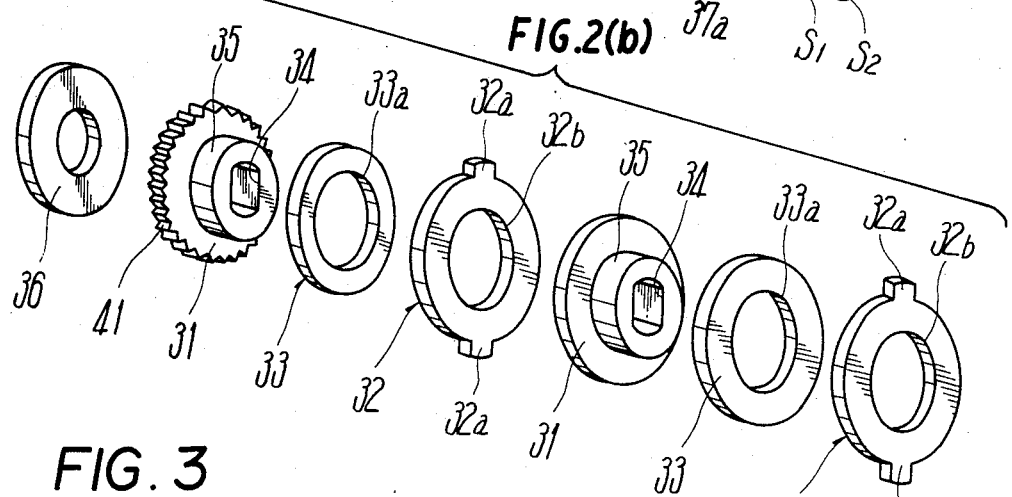
FIG. 2(b) is an exploded explanatory view of the first and second drag washers and lining plates in proper arrangement order before being assembled onto the rotary cylinder.

The invention provides in the spinning reel constructed as abovesaid the drag mechanism 30 for applying resistance to rotation of the spool shaft 4, with the drag mechanism being constructed as shown in FIGS. 1 and 2(a), (b). The drag mechanism includes first drag washer 31 having at its center a tubular holding portion 35 which has a non-circular through bore 34 having non-circular cross-section and supports peripherally the lining plate 33.

The drag mechanism 30 shown in FIG. 1 is mounted to the rear of the spinning reel. The reel body 1 has at its rear a support cylinder 12 extending rearwardly around the through bore 1b. The support cylinder 12 is provided at its inner peripheral surface with a pair of guide grooves 13, 13 which are formed at an interval of 180° and which extends longitudinally of support cylinder 12. Additionally, a rotary cylinder 37 is provided comprising, as shown in FIG. 2(a), a support portion 37a rotatably supported to the through bore 1b and a projecting portion 37b larger in diameter than and extending rearwardly of the support portion 37a and having a non-circular outer peripheral surface $S_1$ and a non-circular inner peripheral surface $S_2$, each with a non-circular cross-section respectively. The rotary cylinder 37 is rotatably supported to the through bore 1b through the support portion 37a.

Spool shaft 4 is structurally related to rotary cylinder 37 as shown in FIG. 2(a), such that spool shaft 4 is provided at its rear portion with a non-circular outer peripheral surface $S_3$ having a non-circular cross-section corresponding to the non-circular inner peripheral surface $S_2$ of the rotary cylinder 37, so that the spool shaft 4 is axially movably fitted to the rotary cylinder 37 through the non-circular outer and inner peripheral surfaces $S_3, S_2$ in relation of being non-rotatable relative to each other. Additionally, between the support cylinder 12 at the reel body 1 and the rotary cylinder 37 is arranged in series two sets of the first and second drag washers 31, 32 and lining plates 33.

The first and second drag washers 31, 32 and lining plates 33 are each made of a flat plate. The first drag washer 31 is integrally provided at its center with the holding tubular portion 35 extending rearwardly of first drag washer 31. The holding tubular portion 35 is made larger in axial length than the widthwise thickness of the lining plate 33 and is made smaller in axial length than the total thickness of the second drag washer 32 and lining plate 33. The first drag washer 31 and holding tubular portion 35 constructed as abovesaid are provided with the non-circular through bore 34 which is formed to have a non-circular cross-section corresponding to the non-circular outer peripheral surface $S_1$ of the rotary cylinder 37, so that the first drag washer 31 and holding tubular portion 35 can be axially movably fitted to the rotary cylinder 37 through the non-circular through bore 34 and non-circular outer peripheral surface $S_1$ in relation of being non-rotatable relative to each other.

The second drag washer 32 is provided at its center with a circular bore 32b substantially larger in diameter than the holding tubular portion 35, and washer 32 includes guide portions 32a, 32a at its outer periphery. Guide portions 32a, 32a project radially outwardly and are fitted slidably to the guide grooves 13, 13 provided at the support cylinder 12. The lining plate 33 is provided at its center with a circular bore 33a substantially larger in diameter than the holding tubular portion 35.

During assembly, the lining plate 33 is first fitted onto the holding tubular portion 35 of the first drag washer 31, and then the second drag washer 32 is fitted to the holding tubular portion 35 with the guide portions 32a, 32a of the washer 32 being fitted in the guide grooves 13, 13 at the support cylinder 12.

In the illustrated embodiment, another lining plate 36 is freely fitted onto the rotary cylinder 37 to be placed at the front of the first drag washer 31 of the first set of drag washes and lining plate which is placed axially forward of the second set, so that the first drag washer 31 and the lining plate 36 can also provide a frictional force therebetween. The first drag washer 31 is provided at its peripheral surface with sound-generating teeth 41 to provide a sound-generating mechanism 40 which generates a sound upon rotation of the spool 9. The sound-generating mechanism 40 comprises a sound-generator 42 which is swingably pivoted within the reel body 1 at its lower portion to place the foremost end of the sound-generator downwardly relative to first drag washer 31. Sound-generator 42 is biased to engage and disengage at its foremost end with respect to the teeth 41, so that the first drag washer 31 is rotated through the rotary cylinder 37 upon rotation of the spool 9 to cause the sound-generator 42 to engage with and disengage from the teeth 41, thereby generating a sound.

In FIG. 1, reference numeral 38 designates an adjustment member which is movably screwed with the inner peripheral surface of the support cylinder 12 to hold a coiled spring 39 for biasing the last second drag washer 32 and to adjust the biasing force of the coiled spring 39. An adjustment knob 38a is detachably fixed to the adjustment member 38 by a screw member 38b.

Furthermore, reference numeral 50 designates an anti-reverse rotation mechanism for the spool 9, and 51 designates a control knob for the anti-reverse rotation mechanism 50.

Next, the function and operation of the spinning reel constructed as abovesaid will be detailed.

First, the adjustment knob 38a of the drag mechanism 30 is turned to move the adjustment member 38 with respect to the support cylinder 12 to thereby press and actuate the coiled spring 39, so that the drag mechanism 30 is actuated to frictionally connect the respective press-contact surfaces of the first and second drag washers 31, 32 and lining plates 33 placed between the first lining plate 36 and the last second drag washer 32. The drag mechanism operatives relative to and against a load torque transmitted from the spool 9 to the rotary cylinder 37 through the spool shaft 4, whereby when magnitudes of the load torque become larger than any magnitude corresponding to the frictional resistance force applied by the drag mechanism 30, the spool 9 is allowed to rotate.

In such actuation of the drag mechanism 30, while each first drag washer 31, 31 is braked by the second drag washers 32, 32 through the lining plates 33, 33 to inhibit rotation of the spool shaft 4, the first drag washers 31 even when forcibly rotated by the spool shaft 4 are not at all deformed at their hitting portions due to reinforcement provided by the holding tubular portion 35. Hence, the drag mechanism 30 can always maintain a stable of constant relationship between the frictional connection force and the corresponding biasing force by the coiled springs 39, thereby enabling accurate adjustment of the frictional resistance applied to rotation of the spool 9.

Additionally, the first drag washer 31 placed forward in the drag mechanism 30 can also serve as a part of the sound-generating mechanism 40 for generating a sound upon rotation of the spool 9. Hence, the drag mechanism can provided by means of its reduced number of parts such additional sound-generating efficiency, and the space within the reel body 1 can be effectively used as a result of the reduced number of parts.

Figure 3:
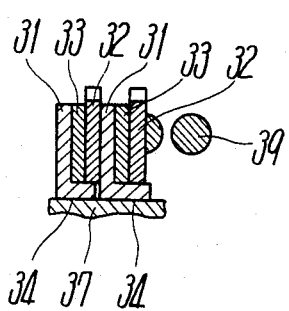
FIGS. 3 through 5 are explanatory views of modified embodiments.

In the abovesaid embodiment, the holding tubular portion 35 is made smaller in length than the total widthwise thickness of the second drag washer 32 and lining plate 33. Alternatively, when the coiled spring 39 is adapted to bias the last second drag washer 32 without abutting against the rear surface of the last holding tubular portion 35, as shown in FIG. 3, the length of the last holding tubular portion 35 can be made larger.

Figure 4:
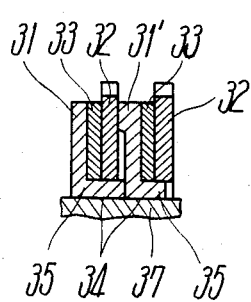

Additionally, when the last first drag washer 31' is provided, as shown in FIG. 4, with a peripheral forward projection for abutting against the second drag washer 32 of the first set, the holding tubular portion 35 of the first set may be made larger in length than the total widthwise thickness of the second drag washer 32 and the lining plate 33.

In addition, the abovesaid embodiment provides two sets of the first and second drag washers 31, 32 and lining plates 33 but may alternatively provide a single set or more than three sets.

Figure 5:
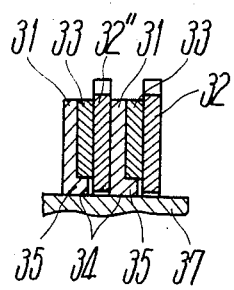

Furthermore, the lining plate 33 and second drag washer 32 are supported onto the holding tubular portion 35. Alternatively, the holding tubular portion 35 may support only the lining plate 33 as shown in FIG. 5. In this case, it will be appreciated that the second drag washer 32 is supported onto the rotary cylinder 37 and does not abut against the rear end surfaces of the holding tubular portions 35 but makes press-contact only with the lining plates 33.

It will be also appreciated that the abovesaid construction of the invention can be applied to any drag mechanism 30 provided either at the rear of the reel or at the front of the spool.

As seen from above, the invention includes a first drag washer having at its center a holding tubular portion supported to the spool shaft to rotate integrally therewith, with the holding tubular portion supporting peripherally the lining plate, so that the first drag washer can be surely and effectively reinforced with respect to or against forced relation by action of the spool shaft, thereby preventing deformation or breakdown of the drag washer caused by rotation of the spool shaft, resulting in a stable and constant relationship between the pressing force and frictional connection force at the drag mechanism, and always enabling accurate adjustments of the resistance applied against rotation of the spool.

Although several embodiments have been described, they are merely exemplary of the invention and are not to be construed as limiting, the invention being defined solely by the appended claims.

I claim:

1. A spinning reel comprising:
   a reel body;
   a spool shaft having a spool supported thereon, said spool shaft rotatably supported to said reel body and movable longitudinally of said body;
   a line-winding mechanism for winding a fishing line onto said spool; and
   a drag mechanism comprising a first drag washer supported non-rotatably to said spool shaft, a second drag washer supported non-rotatably to said reel body, and a lining plate interposed between said first and second drag washers, said first drag washer comprising a tubular holding portion disposed at a central position of said first drag washer, said tubular holding portion having a non-circular through bore, said first drag washer being supported to said spool shaft by said tubular holding portion, said drag mechanism further including a rotary cylinder supported rotatably to said reel body, said rotary cylinder comprising a non-circular inner peripheral surface having a non-circular cross-section and a non-circular outer peripheral surface having a non-circular cross-section, said spool shaft being inserted into said rotary cylinder such that said spool shaft and said rotary cylinder are axially movable relative to each other but are not rotatable relative to each other, and said tubular holding portion being supported to said outer peripheral surface of said rotary cylinder such that said tubular holding portion and said rotary cylinder are axially movable relative to each other but are not rotatable relative to each other, said tubular holding portion being longer in axial length than a widthwise thickness of said lining plate, said lining plate and said second drag washer being supported on an outer periphery of said tubular holding portion, said drag mechanism further comprising first and second sets of drag components, each set comprising a said first drag washer and a said second drag washer and a said lining plate interposed therebetween, said second set comprising a said first drag washer having a projection abutting against a said second drag washer of said first set, a said tubular holding portion of said first drag washer of said first set being longer than a combined thickness of said second drag washer of said first set and a said lining plate of said first set.

2. A spinning reel according to claim 1, wherein a said first drag washer is provided at its outer periphery with sound-generating teeth, and said reel body is provided with a sound-generator engageable with said sound-generating teeth to generate a sound.

* * * * *